United States Patent
Bader et al.

(10) Patent No.: US 10,116,014 B2
(45) Date of Patent: Oct. 30, 2018

(54) METHOD FOR MANUFACTURING AN ENERGY STORE

(71) Applicant: Robert Bosch GmbH, Stuttgart (DE)

(72) Inventors: Maximilan Oscar Bader, Munich (DE); Dirk Schmiederer, Lerma (MX); Sven Robert Raisch, Stuttgart (DE); Carsten Tuechert, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 277 days.

(21) Appl. No.: 14/762,718

(22) PCT Filed: Dec. 3, 2013

(86) PCT No.: PCT/EP2013/075407
§ 371 (c)(1),
(2) Date: Jul. 22, 2015

(87) PCT Pub. No.: WO2014/114392
PCT Pub. Date: Jul. 31, 2014

(65) Prior Publication Data
US 2015/0357690 A1 Dec. 10, 2015

(30) Foreign Application Priority Data

Jan. 23, 2013 (DE) .......... 10 2013 201 052

(51) Int. Cl.
| | |
|---|---|
| *H01M 10/6554* | (2014.01) |
| *H01M 10/613* | (2014.01) |
| *H01M 10/04* | (2006.01) |
| *H01M 10/615* | (2014.01) |
| H01M 10/0525 | (2010.01) |
| H01M 2/10 | (2006.01) |
| H01M 10/6556 | (2014.01) |

(52) U.S. Cl.
CPC ......... *H01M 10/613* (2015.04); *H01M 10/04* (2013.01); *H01M 10/615* (2015.04); *H01M 10/6554* (2015.04); *H01M 2/1077* (2013.01); *H01M 10/0525* (2013.01); *H01M 10/6556* (2015.04); *Y10T 29/4911* (2015.01)

(58) Field of Classification Search
CPC .. H01M 10/613; H01M 10/04; H01M 10/615; H01M 10/6554; H01M 10/0525; H01M 10/6556; H01M 2/1077; Y10T 29/4911
See application file for complete search history.

(56) References Cited

U.S. PATENT DOCUMENTS

| | | | | |
|---|---|---|---|---|
| 4,171,564 A | * | 10/1979 | Acton | H01M 2/24 29/623.2 |
| 6,723,270 B1 | * | 4/2004 | Sugiyama | B01D 29/111 210/493.2 |
| 2005/0089750 A1 | * | 4/2005 | Ng | H01M 2/0242 429/120 |
| 2009/0208829 A1 | * | 8/2009 | Howard | F28D 15/0233 429/120 |
| 2009/0253026 A1 | * | 10/2009 | Gaben | B60R 16/04 429/56 |
| 2009/0280400 A1 | * | 11/2009 | Tsukamoto | C09K 21/06 429/120 |
| 2010/0147488 A1 | * | 6/2010 | Pierre | H01M 2/1077 165/47 |
| 2012/0003508 A1 | * | 1/2012 | Narbonne | H01M 2/1077 429/8 |
| 2012/0164492 A1 | * | 6/2012 | Lachenmeier | H01M 2/166 429/50 |
| 2014/0106198 A1 | * | 4/2014 | Guha | H01M 10/5089 429/120 |

FOREIGN PATENT DOCUMENTS

| | | |
|---|---|---|
| DE | 10 2011 002 415 | 7/2012 |
| JP | 2010 040 420 | 2/2010 |
| WO | WO 03 07 1616 | 8/2003 |
| WO | WO 2012 092 993 | 7/2012 |

OTHER PUBLICATIONS

Zhang et al. "The glass transition temperature of poly(phenylene sulfide) with various crystallinities." Polym Int 2013; 62: 449-453 (Year: 2012).*

* cited by examiner

*Primary Examiner* — Michael L Dignan
(74) *Attorney, Agent, or Firm* — Norton Rose Fulbright US LLP; Gerard Messina

(57) ABSTRACT

A method for manufacturing an electrochemical energy store, includes: a) providing a temperature control plate, the temperature control plate at least partially including a heat-conducting material, and at least one contact area of the temperature control plate being deformable or transferable into a deformable state with the aid of an energy input; b) if necessary, bringing at least one contact area of the temperature control plate into a deformable state with the aid of an energy input; c) applying at least one cell to at least one contact area; and d) setting at least the at least one contact area of the temperature control plate. Also described is an electrochemical energy store.

21 Claims, No Drawings

METHOD FOR MANUFACTURING AN ENERGY STORE

FIELD OF THE INVENTION

The present invention relates to a method for manufacturing an energy store. The present invention relates in particular to a method for manufacturing an energy store having at least one temperature control plate on which at least one electrochemical cell is attached.

BACKGROUND INFORMATION

Energy stores, such as lithium-ion batteries, are very common in many daily applications. They are used in computers, such as laptops, mobile telephones, smart phones and in other applications, for example. Such batteries also offer advantages in the electrification of vehicles, such as motor vehicles, which is presently being heavily promoted.

Lithium-ion cells as integral parts of lithium-ion batteries conventionally include a metallic casing. Usually multiple of these cells are assembled to form a battery module, multiple, for example three or more, of these battery modules in turn being assemblable to form a battery pack.

For the purpose of temperature control, the battery modules or battery packs are typically installed on a metallic cooling plate. To prevent a short circuit between the cells and the metallic cooling plate, an electrical insulator is provided between the cells and the metallic plate.

A temperature control plate for a galvanic cell is discussed in the publication DE 10 2011 002 415 A1. Such a temperature control plate is in particular part of a cell housing, such as the cover of a cell housing.

SUMMARY OF THE INVENTION

The present invention relates to a method for manufacturing an electrochemical energy store, including the following method steps:
a) providing a temperature control plate, the temperature control plate at least partially including a heat-conducting material, and at least one contact area of the temperature control plate being deformable or transferable into a deformable state with the aid of an energy input;
b) if necessary, bringing at least one contact area of the temperature control plate into a deformable state with the aid of an energy input;
c) applying at least one cell to at least one contact area; and
d) setting at least the at least one contact area of the temperature control plate.

DETAILED DESCRIPTION

An electrochemical energy store within the meaning of the present invention may in particular include any battery. In particular, an energy store may above all include a secondary battery, i.e., a rechargeable battery, in addition to a primary battery. A battery may include or be a galvanic element or multiple galvanic elements which are connected among each other. For example, an energy store may include a lithium-based energy store, such as a lithium-ion battery. A lithium-based energy store, such as a lithium-ion battery, may in particular be understood to mean such an energy store whose electrochemical processes during a charging or discharging process are at least partially based on lithium ions.

A temperature control plate within the meaning of the present invention may further be understood to mean an in particular plate-shaped element which may be configured, as a result of a heat-conducting or thermal contact with at least one cell, to control the temperature of this cell, i.e., to conduct heat from the temperature control plate to the cell or from the cell to the temperature control plate, for example. For this purpose, the temperature control plate may include at least one temperature control structure, for example. A temperature control plate may be a cooling plate, for example, which is generally known for energy stores.

A heat-conducting material within the meaning of the present invention may in particular be a material having a thermal conductivity which, measured at an ambient temperature of 20° C. and 50% humidity, is in a range of greater than or equal to 0.2 W/m*K, in particular in a range of greater than or equal to 0.5 W/m*K.

A deformable area of the temperature control plate within the meaning of the present invention may furthermore be an area which is plastically or elastically deformable, for example, under conditions suitable for a large-scale manufacturing process. In particular, a deformability may exist when a pressure in a range of greater than or equal to 0.1 N/cm$^2$ is exerted for a time period of less than one hour, in particular less than one minute, for example less than five seconds, which may be less than two seconds.

A contact area of the temperature control plate shall furthermore be understood to mean an area or a position, in particular on the surface of the temperature control plate, which is provided for positioning at least one cell there. If only one cell is provided, for example, only one contact area may be provided. If more than one cell is provided, moreover an enlarged contact area or multiple contact areas may be provided. In this way the contact area may be adapted, in particular with respect to its expansion along the surface and with respect to its depth into the material, to the size or the dimensions of the at least one cell to be applied.

An above-described method makes it possible to connect a stable fixation of at least one cell on a temperature control plate to an improved heat-conducting path in a cost-effective manner, in order to allow improved temperature control of the at least one cell.

For this purpose, the above-described method, in a first method step a), includes providing a temperature control plate, the temperature control plate at least partially including a heat-conducting material, for example being formed at least partially of a heat-conducting material, or being formed completely of a heat-conducting material. By the temperature control plate at least partially including a heat-conducting material, the temperature control plate is able to achieve good and effective temperature control of the at least one cell in the finished state. The entire material of the temperature control plate may be formed of a heat-conducting material, or the heat-conducting material may be limited to individual areas, which may form one or multiple heat-conducting channels. Heat-conducting channels may be situated in a matrix made up of a non-heat-conducting material, for example.

In addition to the heat-conducting material, the temperature control plate may include one or multiple temperature control medium channels for conducting a temperature control agent through the temperature control plate and/or one or multiple temperature control ribs for dissipating heat, for example. In this way, the effectiveness of the heat-conducting path may advantageously be significantly improved. The temperature control agent may generally be a liquid, gaseous or solid temperature control agent. In particular, the temperature control agent may be a liquid or gaseous temperature control agent. The temperature control plate may have at least one temperature control agent introduction connection for introducing a liquid or gaseous temperature control agent into the temperature control agent channel or channels, and at least one temperature control agent discharge connection for discharging the liquid or gaseous temperature control agent from the temperature control agent channel or channels.

The temperature control or the formation of the heat-conducting path may be improved by at least one contact area of the temperature control plate being deformable or transferable into a deformable state with the aid of an energy input. This may mean that either the entire temperature control plate is formed of such a material, or only one or multiple contact areas of the temperature control plate, on which the at least one cell is or the multiple cells are situated and fixed. In this way, at least one contact area of the temperature control plate, for example, may include a material which is elastically deformable or transferred into an elastic state with the aid of an energy input, such as a treatment by a heat source, for example, or by a source of electromagnetic radiation. Moreover, the one contact area of the temperature control plate may include a material, for example, which is plastically deformable or transferred into a plastically deformable state with the aid of an energy input, as is described below. The material may consequently be elastically or plastically deformable in a defined area, in particular as defined above.

In particular when a deformable state is not already present under normal conditions, i.e., in particular at room temperature (22° C.), but the corresponding material may be brought into a deformable state, this may take place in the above-described method in method step b), method step b) including bringing at least one contact area of the temperature control plate into a deformable state with the aid of an energy input. In this way, at a minimum at least one contact area or the entire temperature control plate is brought into a deformable or plastically or elastically deformable state with the aid of an energy input as described above, i.e., by a treatment with heat, electromagnetic radiation, or the like.

In particular, in the latter case at least one contact area of the temperature control plate may be brought with the aid of an energy input via its melting range or its glass transition range. In this embodiment, the material of the temperature control plate or of the contact area, or of the contact areas, of the temperature control plate may be transferred into a deformable state in a particularly easy and defined manner. In detail, the corresponding material may be heated with the aid of a heat input, such as by a radiant heater or the like, to a temperature which is above the melting range or the melting temperature, or the glass transition range or the glass transition temperature. In this state, the material may be easily deformed, subsequently setting or complete hardening being carried out, for example by mere cooling, as is described in detail below.

When the temperature control plate or at least one contact area of the temperature control plate is in a deformable state, at least one cell may be applied to at least one contact area in a further method step c). For example, one cell or a suitable multitude of cells may be situated on the contact area or the contact areas in such a way that a portion of the deformable material is deformed by the cell, and thus a very tight contact is obtained between the cell or the cell housing and the contact area or the contact areas of the temperature control plate. In this way, the surface of the temperature control plate adapts to the production-related unevenness of the cells by mere pressing and levels the same, whereby a contact is created between the cell and the temperature control plate across the full surface. Due to the resulting lower resistance of the heat-conducting path, more efficient temperature control of the cells may be achieved.

This applies in particular to the edges of the cell housings, at which the largest amount of heat must be dissipated for design reasons. The service life of the cells may thus be considerably increased due to more efficient temperature control. In this way, the above-described method may be used to compensate for the fact that contact across the full surface is possible only to a limited extent when the cells are being applied, for example due to the low mechanical flexibility and the production-related unevenness of both the cell bottom and possibly, as a function of the material, also of the temperature control plate. In contrast, contacting of the cell and temperature control plate across the full surface may be achieved by the above-described method, which may result in an increase in the usable area available for heat transfer, and thus in particularly efficient and homogeneous temperature control of the cell.

After at least one cell has been applied to at least one contact area, according to method step d) at a minimum the at least one contact area of the temperature control plate is set or solidified or hardened. This may be achievable by mere active or passive cooling of the material for the exemplary case that the corresponding material may be transferred into an in particular plastically deformable state with the aid of an energy input. Alternatively this may be achievable with the aid of a cross-linking reaction for the exemplary case that the corresponding material is elastically deformable already at room temperature, for example. In this case, for example, pressing of the at least one cell into the deformable material may continue until the hardening is completed, and a cross-linking reaction may be triggered with the aid of an energy input. In this way, setting may be achieved, for example, by ending or starting an energy input. Setting may thus essentially take place as a function of the selected material of the contact area or of the contact areas of the temperature control plate.

To create a stable bond between the cell, or the multiple cells, and the temperature control plate, the cells may be braced against each other, in addition to the above-described method, and connected to the temperature control plate, such as screwed or braced, via end plates, if necessary.

Moreover, the stresses in the temperature control plate, which occur by an inserting or pressing of the cells, for example, may be reduced with the aid of a temperature treatment and the resulting expedited creep process, for example, in a thermoplastic polymer.

The temperature control plate may furthermore at least partially include an electrically insulating material, for example it may be at least partially formed of an electrically insulating material, or be formed completely of an electrically insulating material. In this embodiment, providing an electrical insulator and/or wrapping or coating the cells with an electrically insulating material for electrical insulation between the battery cells and the temperature control plate may furthermore be dispensed with, for example to avoid a short circuit. As a result, the production complexity may be minimized, which contributes to lowering the production costs. Moreover, the overall weight of the module may be lowered, thus increasing the power density of the system. In addition, the resistance of the heat-conducting path between the battery cell housing and the temperature control plate is thus reduced, since additionally introduced coatings and/or winding layers made of electrically insulating material may be dispensed with. As a result, more effective temperature control of the cells may be achieved. This decisively contributes to an increase in the service life of the module package. Moreover, a savings of installation space within the module, and thus of material costs, may be possible. Additionally, it may be prevented that electrically conductive particles, with which the system is contaminated during assembly, cause a short circuit due to mechanical loads. On the other hand, it may be prevented that the loss of electrical insulation in the event of improper assembly due to abrasion of the insulating layer/layers among each other results in a short circuit.

An electrically insulating material within the meaning of the present invention may in particular be a material having an electrical surface resistance which is in a range of greater than or equal to 10^12 ohm.

However, a further electrical insulation or stability increase may be provided for the non-electrically insulating coated cells having a metallic cell housing, for example an aluminum housing. In particular, without limiting the present invention, plastic plates and/or plastic foils may be situated between the cells, for example, after setting or hardening, for mutual electrical insulation, or the cells may be present in a plastic housing having individual compartments. This may thus in particular serve for an electrical insulation of the cells among each other and does not impair the heat-conducting path from the cell or the cells to the temperature control plate.

It is understood by those skilled in the art that the above-mentioned method steps may be carried out independently of each other, immediately following each other, or at least partially together or simultaneously.

Within the scope of one embodiment, the temperature control plate may at least partially be made of a material which is selected from the group including polyethylene, polypropylene, polyamide, polybutylene terephthalate, polyphenylene sulfide, polycarbonate, such as for materials which are deformable and shapeable under energy input, or also polyurethane for a material which is elastically deformable and cross-linkable already at room temperature. Such materials may have an advantageous electrical insulation capability, and furthermore may have a thermal conductivity which is sufficient for many applications with low heat development, for example, and thus a little need for temperature control. A purely electrically powered vehicle shall be mentioned here as an exemplary application. In this embodiment, the temperature control plate may furthermore be manufacturable particularly easily and cost-effectively.

Within the scope of a further embodiment, at least one section of the temperature control plate provided for temperature control may be formed of a plastic compound which includes at least one additive to increase the thermal conductivity.

A plastic compound within the meaning of the present invention may be understood to mean in particular a composite which in addition to one or multiple base polymers, such as polypropylene, includes at least one additive for modifying the base polymer properties.

An additive for increasing the thermal conductivity within the meaning of the present invention may be understood to mean in particular an additive which increases the specific thermal conductivity of the plastic compound, based on the specific thermal conductivity of the plastic compound without the thermal conductivity-increasing additive.

The at least one section which is provided for heat dissipation and, if necessary, bounds the temperature control channel may be formed of a plastic compound which, measured at an ambient temperature of 20° C. and 50% humidity, has a specific thermal conductivity $\lambda$ of greater than or equal to 0.5 W/(m·K), in particular of greater than or equal to 0.7 W/(m·K), for example of greater than or equal to 1 W/(m·K), and a specific electrical resistance $\rho$ of greater than or equal to $1 \cdot 10^{-5} \Omega \cdot m$, in particular of greater than or equal to $1 \cdot 10^{-1} \Omega \cdot m$, for example of greater than or equal to $1 \cdot 10^{-1} \Omega \cdot m$.

The additive or the additives for increasing the thermal conductivity, measured at an ambient temperature of 20° C. and 50% humidity, which may have a specific thermal conductivity $\lambda$ of greater than or equal to 10 W/(m·K), in particular of greater than or equal to 20 W/(m·K), for example of greater than or equal to 50 W/(m·K), and/or a specific electrical resistance $\rho$ of greater than or equal to $1 \cdot 10^{-5} \Omega \cdot m$, in particular of greater than or equal to $1 \cdot 10^{-1} \Omega \cdot m$, for example of greater than or equal to $1 \cdot 10^{4} \Omega \cdot m$.

For example, the additive for increasing the thermal conductivity may be a ceramic material. The additive for increasing the thermal conductivity may be boron nitride, aluminum oxide, aluminum hydroxide, magnesium hydroxide, magnesium oxide or a combination thereof, for example.

At least one section of the temperature control plate which is provided for heat dissipation and at least partially abuts at least one temperature control structure, for example, and/or at least partially forms at least one temperature control structure may be formed of a plastic compound which includes at least one additive for increasing the thermal conductivity. In particular, the at least one section of the temperature control plate which is provided for heat dissipation and formed of a plastic compound including a thermal conductivity additive may at least partially abut the at least one temperature control structure and/or at least partially form the at least one temperature control structure.

Within the scope of one further embodiment, a heat-conducting medium may be situated between at least one contact area of the temperature control plate and at least one cell. Such a medium may, on the one hand, further contribute to tolerance compensation and further improve the heat transfer between the cell and the temperature control plate, and thus contribute to reducing the thermal resistance between the cell housing and the temperature control plate. Due to the possible electrically insulating design of the temperature control plate, it is not harmful if the heat conducting, in particular elastic, medium has a lower strength, since pressing of the cell housing onto the temperature control plate, for example due to the mechanical stresses during use, is able to avoid a short circuit. Pressing may generally even be advantageous since a local contact between the cell bottom and the temperature control plate results in reduced thermal resistance. The tolerance- and unevenness-related areas without direct contact between the cell bottom and the cooling plate are filled by the medium having, for example, a small thickness, which further reduces the thermal resistance. For this purpose, the heat-conducting medium may be deformed/displaced during an application of the at least one cell, for example, to such an extent that a direct contact may result between the cell bottom and the cooling plate, which has a lower heat transmission resistance.

Within the scope of one further embodiment, the heat-conducting medium may be electrically insulating. One advantage of this embodiment may in particular be the lower susceptibility to short circuits, which may enable further improved longevity and safety. Moreover, designs of the temperature control plate which are not, or not completely, electrically insulating are also possible in this embodiment.

Within the scope of one further embodiment, the heat-conducting medium may be elastic and/or have a breaking elongation in a range of greater than or equal to 10%. In this embodiment, it is possible to achieve the advantage that the heat-conducting medium having a high breaking elongation is able to compensate for differences in the thermal expansion coefficient between the temperature control plate and the cell, which otherwise during temperature changes could result in detachment and worsening of the heat transfer. For example, the heat-conducting medium may include at least one silicone-based material, such as the thermally conductive adhesive available from Dow Corning® by the designation Q1-9226.

For example, a thermally conductive adhesive and/or a thermally conductive foil may be used as the heat-conducting medium, such as a thermally conductively modified elastomer or thermoplastic elastomer, which is situated between the cell and the temperature control plate. In this way, heat dissipation may advantageously be improved.

Within the scope of one further embodiment, method step c) may be carried out by a pressure-based application of at least one cell to the contact area. In particular by a pressure-based application of the at least one cell to the temperature control plate, the cell may be particularly advantageously be pressed into the material of the at least one contact area, and the material on the temperature control plate surface may thereby be adapted to the housing of the cells, and a contact across the full surface may be achieved. As a result, particularly high stability and moreover a particularly effective heat-conducting path may be facilitated. The exerted pressure may be adapted to the deformability of the contact area and to the desired penetration depth.

Within the scope of one further embodiment, multiple cells may be applied to the temperature control plate. Within the scope of this specific embodiment of the method for manufacturing an energy store, the cell holder for accommodating and controlling the temperature of two or more galvanic cells, in particular the galvanic cells of a battery module, may be configured, for example, from more than or equal to 4 to fewer than or equal to 20, for example from more than or equal to 6 to fewer than or equal to 18, galvanic cells. This has the advantage that it is possible to individually compile the individual battery modules and adapt them to the available space. Moreover, a particularly cost-effective manufacturing method of the energy store may be possible in this embodiment. Furthermore, particularly good temperature control of the cells may be facilitated, and furthermore the stability of the energy store may be improved.

With respect to further technical features and advantages of the method according to the present invention reference is hereby explicitly made to the explanations provided in conjunction with the energy store according to the present invention.

The present invention further relates to an energy store, manufactured according to a method as described above. Such an energy store, in particular electrochemical energy store, may enable the advantage of a particularly effective temperature controllability of its battery cells, and furthermore of a particularly stable and cost-effective manufacturability. Such an energy store may generally be any type of energy store, in particular a battery, such as a rechargeable battery. The energy store may be a rechargeable lithium-ion battery, for example. Possible fields of application include electrically powered vehicles, computers, such as laptops, mobile telephones, smart phones, electric tools and further applications, such as completely electrically powered vehicles (EV) or partially electrically powered vehicles (hybrid vehicles, PHEV).

In detail, an above-described energy store may be a lithium-based energy store, such as a lithium-ion battery. Its anode and the cathode may generally be configured in a manner known per se, as is known for an energy store. For the purely exemplary case of a lithium-ion battery, the anode may be an electrode, which includes metallic lithium or may intercalate lithium. The cathode may include NMC or lithium cobalt oxide ($LiCoO_2$), by way of example. The cathode material may be present in a binder, if necessary, such as polyvinylidene fluoride (PVDF), for example together with a conductive additive, such as an electrically conductive carbon compound, for example graphite. The electrolyte may include a solvent in which one or multiple electrically conductive salts is/are dissolved. For example, aprotic solvents may be used, such as ethylene carbonate, propylene carbonate, dimethyl carbonate or diethyl carbonate. In addition, lithium hexafluorophosphate ($LiPF_6$) may be used as an electrically conductive salt.

Moreover, a separator may be situated between the anode and the cathode in a manner known per se to spatially separate the anode and the cathode from each other, in particular in order to prevent a short circuit. For example, the separator may include or be formed of in particular porous plastic foils, glass fiber fabrics, or also in particular porous ceramic materials, such as ceramic fabrics. The electrolyte may be situated within the separator or pores of the separator, for example.

A system, also referred to as jelly roll, made up of electrode materials, i.e., anode and cathode, active material, electrolyte, and separator, if necessary, may generally be provided as a galvanic element situated in a cell area or as a battery cell. These cells may be assembled to form a battery cell, for example, such as in a housing made up of aluminum, and multiple of these battery cells may be assembled to form a battery module.

With respect to further technical features and advantages of the energy store according to the present invention reference is hereby explicitly made to the explanations provided in conjunction with the method according to the present invention.

What is claimed is:

1. A method for manufacturing an electrochemical energy store, the method comprising:
providing a temperature control plate made of plastic, the temperature control plate at least partially including a heat-conducting material, and at least one contact area of the temperature control plate being plastically deformable;
bringing the at least one contact area into a deformable state by applying to the at least one contact area a pressure of greater than 0.1 N/cm$^2$ for a time period of less than one hour;
while the at least one contact area is in the deformable state, applying a housing of at least one cell to the at least one contact area, and deforming the at least one contact area by the applying of the housing of the at least one cell to the at least one contact area to adapt a shape of the at least one contact area to the housing of the at least one cell, the applying of the housing of the at least one cell to the at least one contact area being a pressure-based application of the housing of the at least one cell to the at least one contact area in which the housing of the at least one cell is pressed into a material of the at least one contact area to deform the at least one contact area to adapt the at least one contact area to the shape of the housing of the at least one cell; and hardening at least the at least one contact area of the temperature control plate after the deforming to set the at least one contact area in the adapted shape.

2. The method of claim 1, wherein a temperature control plate is provided which at least partially includes an electrically insulating material.

3. The method of claim 1, wherein the temperature control plate is at least partially made of a material which is selected from the group including polyethylene, polypropylene, polyamide, polybutylene terephthalate, polyphenylene sulfide, polycarbonate, polyurethane.

4. The method of claim 1, wherein at least one section of the temperature control plate provided for temperature control is formed of a plastic compound, which includes at least one additive for increasing the thermal conductivity.

5. The method of claim 1, wherein a heat-conducting medium is situated between at least one contact area of the temperature control plate and the housing of the at least one cell.

6. The method of claim 5, wherein the heat-conducting medium is electrically insulating.

7. The method of claim 5, wherein the heat-conducting medium has a breaking elongation in a range of greater than or equal to 10%.

8. The method of claim 1, wherein housings of multiple cells are applied to the temperature control plate.

9. The method of claim 1, wherein the hardening is achieved by passive cooling.

10. The method of claim 1, wherein the hardening is achieved by a cross-linking reaction of the plastic.

11. The method of claim 10, wherein the cross-linking reaction is triggered by applying energy.

12. The method of claim 1, wherein the deforming step includes plastically deforming the at least one contact area to adapt the shape of the at least one contact area to a shape of the housing of the at least one cell.

13. The method as recited in claim 1, wherein the housing of the at least one cell is a plastic housing.

14. The method as recited in claim 1, wherein the housing of the at least one cell is a metal housing.

15. The method as recited in claim 14, wherein the metal housing is an aluminum housing.

16. The method as recited in claim 1, wherein an anode, a cathode, active material, and electrolyte are in the housing of the at least one cell.

17. An energy store, comprising:
an electrochemical energy store arrangement, including:
a temperature control plate made of plastic, the temperature control plate at least partially including a heat-conducting material, and at least one contact area of the temperature control plate being plastically deformable;
at least one cell housed in a housing, the housing of the at least one cell having been applied to at least one contact area of the temperature control plate while the housing of the at least one contact area is in a deformable state, the at least one contact area being brought into a deformable state by applying, to the at least one contact area, a pressure of greater than 0.1 N/cm$^2$ for a time period of less than one hour, the at least one contact area being deformed by the housing of the at least one cell to adapt a shape of the at least one contact area to the housing of the at least one cell, the at least one contact area being hardened to set the at least one contact area in the adapted shape, the applying of the housing of the at least one cell to the at least one contact area being a pressure-based application of the housing of the at least one cell to the at least one contact area in which the housing of the at least one cell is pressed into a material of the at least one contact area to deform the at least one contact area to adapt the at least one contact area to the shape of the housing of the at least one cell.

18. The energy store as recited in claim 17, wherein the housing of the at least one cell is a plastic housing.

19. The energy store as recited in claim 17, wherein the housing of the at least one cell is a metal housing.

20. The energy store as recited in claim 19, wherein the metal housing is an aluminum housing.

21. The energy store as recited in claim 17, wherein an anode, a cathode, active material, and electrolyte are in the housing of the at least one cell.

\* \* \* \* \*